United States Patent [19]

Asahara et al.

[11] Patent Number: 4,563,205
[45] Date of Patent: Jan. 7, 1986

[54] PROCESS FOR THE PRODUCTION OF SLAB-SHAPED LENS HAVING GRADIENT OF REFRACTIVE INDEX IN THICKNESS DIRECTION ONLY

[75] Inventors: Yoshiyuki Asahara; Hiroshi Sakai; Seiichi Shingaki, all of Tokyo; Shigeaki Ohmi, Saitama, all of Japan

[73] Assignee: Hoya Corporation, Tokyo, Japan

[21] Appl. No.: 572,241

[22] Filed: Jan. 20, 1984

[30] Foreign Application Priority Data

Feb. 4, 1983 [JP] Japan ................................. 58-16109

[51] Int. Cl.$^4$ ...................... C03C 21/00; C03C 19/00
[52] U.S. Cl. ..................................... 65/30.13; 65/31
[58] Field of Search ................... 65/30.13, 31, 3.14, 65/3.15, 60.51; 350/96.18, 96.31

[56] References Cited

U.S. PATENT DOCUMENTS

| | | | |
|---|---|---|---|
| 3,486,808 | 12/1969 | Hamblen | 65/30.13 X |
| 3,941,474 | 3/1976 | Kitano et al. | 65/30.13 X |
| 4,073,579 | 2/1978 | Deeg et al. | 65/30.13 X |
| 4,110,093 | 8/1978 | Macedo et al. | 65/30.13 X |
| 4,299,608 | 11/1981 | Macedo et al. | 65/30.13 X |
| 4,302,231 | 11/1981 | Macedo et al. | 65/30.13 X |

Primary Examiner—Kenneth M. Schor
Attorney, Agent, or Firm—Oblon, Fisher, Spivak, McClelland & Maier

[57] ABSTRACT

A process for the production of a slab-shaped lens having a gradient of refractive index only in the direction of thickness thereof is described, comprising stuffing a solution of dopant into micropores of a plate-shaped porous glass product with or without a heat-resistant film covered on both side surfaces thereof; unstuffing a part of the dopant to form a gradient of dopant concentration in the glass product; precipitating the dopant in the micropores; drying the porous glass product to evaporate the solvent remaining in the micropores; collapsing the micropores by applying a heat treatment to form a gradient of refractive index in the plate-shaped glass product; and when the side surfaces are not covered with the film, cutting off both side end portions of the plate-shaped glass product.

1 Claim, 8 Drawing Figures

PROCESS FOR THE PRODUCTION OF SLAB-SHAPED LENS HAVING GRADIENT OF REFRACTIVE INDEX IN THICKNESS DIRECTION ONLY

FIELD OF THE INVENTION

The present invention relates to a process for producing a slab-shaped lens having a gradient of refractive index only in its thickness direction, which is used, for example, in an optical coupling between an optical transmission fiber and a semiconductor laser light source.

BACKGROUND OF THE INVENTION

As one of the light beam-controlling techniques in the optical fiber communication system, a light source-optical fiber coupling technique to couple an output light from a semiconductor laser (LD) or light-emitting diode (LED) as a light source to a transmission path of optical fiber with high efficiency is important to increase the reliability of the communication circuit. In general, the output light from a light source is converged by means of an optical element such as a lens to improve its coupling efficiency to an optical fiber. As this optical element, a cylindrical lens, a spherical lens, a convergent rod lens having a gradient of refractive index, an ordinary non-spherical surface lens, or a combination thereof is considered to be effective.

Of these optical elements, the cylindrical lens is effective to converge a beam of light in one direction and, in particular, effective to collimate a beam of light having an emission angle varying with its direction as generated from a semiconductor laser light source. However, it is not possible for the cylindrical lens to completely collimate a beam of light because of its aberration. Furthermore, a non-spherical surface cylindrical lens is difficult to produce by polishing glass.

The present invention is intended to provide a slab-shaped lens having a gradient of refractive index in only one direction by utilizing a molecular stuffing method.

The molecular stuffing method is known as a method of preparing a rod-shaped glass product having a gradient of refractive index. In accordance with this method, a porous glass rod is used as a raw material and its fine pores are filled with dopants (refractive index modifying components). Japanese Patent Application (OPI) No. 126207/76 (the term "OPI" as used herein means a "published unexamined Japanese patent application") discloses, as well as a process for the production of porous glass, a process for the production of a glass product having a gradient of refractive index by utilizing the molecular stuffing method.

This process for the production of a glass product having a gradient of refractive index is described below.

A borosilicate glass is subjected to a heat treatment under predetermined conditions to separate it a $SiO_2$-rich phase and an alkali metal oxide and $B_2O_3$-rich phase. This alkali metal oxide and $B_2O_3$-rich phase is easily soluble in acids and thus leached by treating with an aqueous solution of an acid such as hydrochloric acid, sulfuric acid, and nitric acid to prepare a porous glass having continuous micropores with the $SiO_2$-rich phase as a skeleton. A solution of dopants is permeated into the micropores of the porous glass product as prepared above (stuffing) and then part of the dopants is leached out from the outside of the glass product (unstuffing) to form a gradient of dopant concentration in the glass product. Thereafter, the dopants are precipitated, and the glass product is dried and further subjected to a heat treatment to collapse the micropores, whereby the desired glass product having a gradient of refractive index in the direction of radius can be obtained. In the thus-produced rod-shaped glass product having a gradient of refractive index in the direction of radius, the gradient of refractive index varies according to the following equation (1):

$$n(r)^2 = n_0^2[1 - (gr)^2]$$

wherein r represents the radius, $n_0$ represents the refractive index of the central portion, and g is a constant. Thus the glass product can be used as a rod-shaped lens for microlens arrays, or a microlens for coupling optical communication fibers.

SUMMARY OF THE INVENTION

An object of the invention is to provide a process for the production of a slab-shaped lens having a gradient of refractive index in only one direction by utilizing the molecular stuffing method as described above.

The present invention, in one embodiment thereof, relates to a process for producing a slab-shaped lens having a gradient of refractive index in only the direction of thickness which comprises:

stuffing a solution of a dopant into micropores of a plate-shaped porous glass product;

unstuffing a part of the dopant to form a gradient of dopant concentration in the porous glass product;

precipitating the dopant in the micropores;

drying the porous glass product to evaporate the solvent remaining in the micropores;

collapsing the micropores by applying a heat treatment to form a gradient of refractive index in the plate-shaped glass product; and cutting off both side end portions of the plate-shaped glass product.

In another embodiment, the present invention relates to a process for producing a slab-shaped lens having a gradient of refractive index in only the direction of thickness which comprises:

covering both side surfaces of a plate-shaped porous glass product with a heat-resistant film;

stuffing a solution of a dopant into micropores of the plate-shaped porous glass product;

unstuffing a part of the dopant in the direction of thickness to form a gradient of dopant concentration in the plate-shaped porous glass product in only the direction of thickness thereof;

precipitating the dopant in the micropores;

drying the porous glass product to evaporate the solvent remaining in the micropores; and collapsing the micropores by applying a heat treatment to form a gradient of refractive index in only the direction of thickness.

Figure 1:
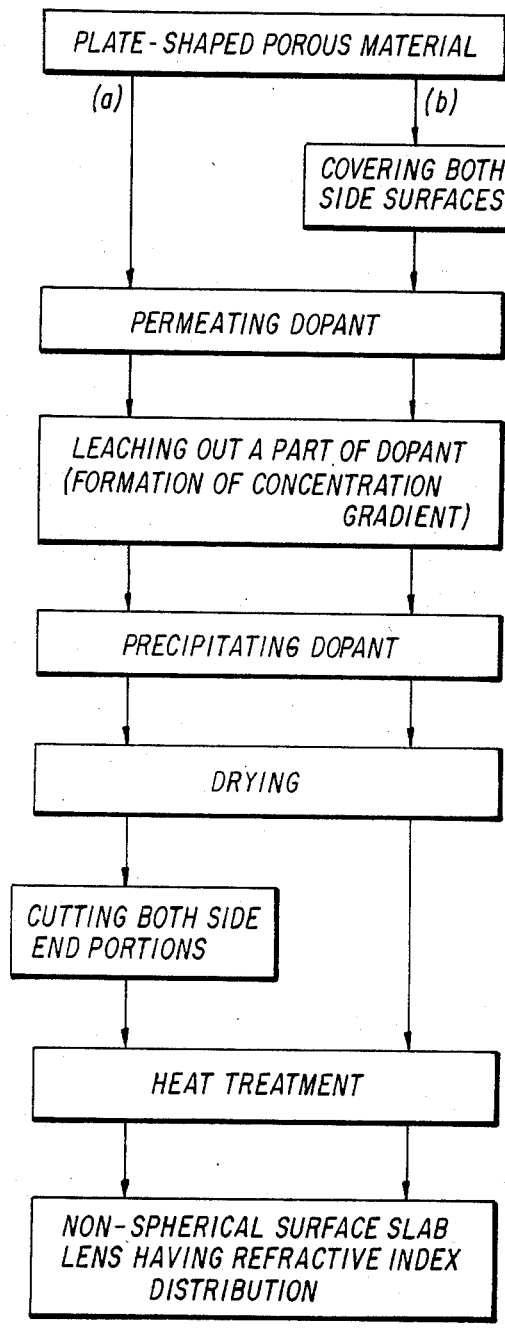
FIG. 1 is a block diagram illustrating the process of the invention.

The reference numerals as used herein indicate the following parts:

1 . . . Plate-shaped porous glass product
2, 2'. . . Side surfaces of the porous glass product
3 . . . Concentration distribution curve
4, 7 . . . Light source
5 . . . Slab lens
6 . . . Parallel light
8 . . . Convergent light.

DETAILED DESCRIPTION OF THE INVENTION

The plate-shaped porous glass product used as a raw material in the process of the invention can be prepared, for example, by a method as described below.

A plate-shaped borosilicate glass capable of undergoing phase separation is subjected to a heat treatment under predetermined conditions to separate it into a $SiO_2$-rich phase and an alkali metal oxide and $B_2O_3$-rich phase. Then, the glass plate is treated with an aqueous solution containing an acid such as hydrochloric acid, sulfuric acid and nitric acid to leach out the easily acid-soluble phase rich in the alkali metal oxide and $B_2O_3$, whereby the desired porous glass product having continuous micropores with the $SiO_2$-rich phase as a skeleton can be obtained. In the plate-shaped porous glass product as used herein, the width is preferably at least two times the thickness.

The process of the invention is described by reference to the accompanying drawings.

Figure 2:
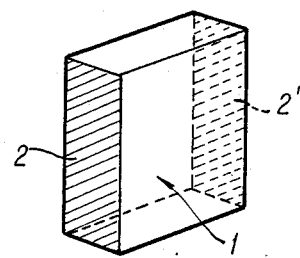
FIG. 2 is a perspective view of a plate-shaped porous glass product covered with a film at both side surfaces.
Figure 3A:
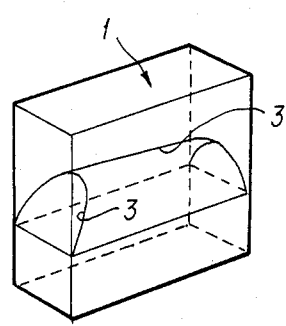
FIGS. 3(a) and 3(b) are three-dimensional curves illustrating the distribution of dopant concentration in a plate-shaped glass product.
Figure 3B:
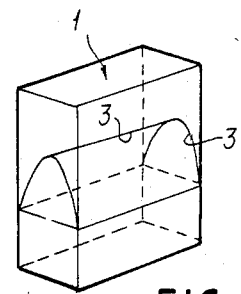

FIG. 1 is a block diagram illustrating all the steps of the invention, in which a route (a) indicates the first embodiment of the invention as described above and a route (b) the second embodiment. In accordance with the process of the invention, a plate-shaped porous glass product 1 is soaked in a dopant solution as such or after covering both side surfaces 2 and 2' of the glass product 1 with a heat-resistant film as shown in FIG. 2. In this manner, the micropores of the glass product 1 are filled with the dopant. Then, the glass product 1 is soaked in water or a mixed solution of water and an organic solvent to leach out a part of the dopant from the outside of the porous glass product 1, whereby a gradient of dopant concentration as shown in FIG. 3(a) or 3(b) is formed in the glass product 1. That is, FIG. 3(a) shows a dopant distribution curve 3 when the stuffing and unstuffing processes are performed without covering both side surfaces of the glass product 1 with the film, whereas FIG. 3(b) shows a dopant distribution curve 3 when the stuffing and unstuffing processes are performed after covering both side surfaces of the glass product 1. Regardless whether or not both side surfaces of the glass product 1 are covered with the film, it is preferred for the top and bottom surfaces of the glass product 1 to be covered with a heat resistant film for the purpose of inhibiting the stuffing and unstuffing of the dopant in the lengthwise direction of the glass product 1.

After the formation of the predetermined dopant distribution in the porous glass product, the porous glass product is soaked in an organic solvent maintained at a low temperature to precipitate the dopant in the micropores thereof. Then, the glass product is dried to evaporate the solvent remaining in the micropores. After the removal of the film in the case that the side surfaces have been covered therewith, the micropores are collapsed by applying a heat treatment. In this manner, a plate-shaped glass product having a gradient of refractive index can be obtained.

The refractive index distribution curve of the plate-shaped glass product as prepared above is analogous to the dopant distribution curve shown in FIG. 3. The refractive index distribution curve of the plate-shaped glass product as prepared without covering its side surfaces is, as can be presumed from FIG. 3(a), such that the refractive index becomes smaller gradually toward the outside in the direction of thickness, it also becomes smaller gradually toward the outside only at both side end portions in the direction of width, but it is constant or uniform at the central portion. In this case, if the width of the plate-shaped porous glass product is less than two times the thickness, a part having a uniform refractive index cannot be formed at the central portion in the direction of width. Even in the case in which the process of the invention is performed without covering the side surfaces with the film, a plate-shaped glass product having a uniform refractive index in the direction of width at the central portion thereof can be obtained by employing, as a raw material, a plate-shaped porous glass product in which the width is at least two times the thickness. Therefore, when the side end portions are cut off from the plate-shaped glass product to remove parts in which the refractive index becomes smaller in the direction of width and to leave only a part in which the refractive index in the direction of width is uniform, a slab-shaped glass having a gradient of refractive index only in the direction of thickness can be obtained.

Figure 4:
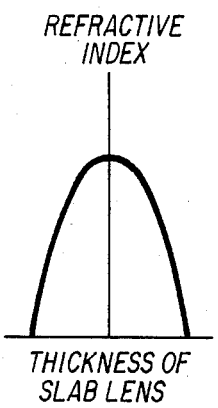
FIG. 4 is a curve of distribution of refractive index in the slab lens of the invention in the direction of thickness thereof.
Figure 5:
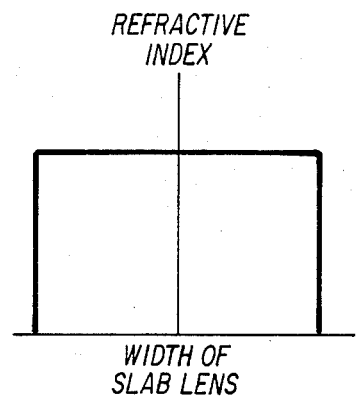
FIG. 5 is a curve of distribution of refractive index in the slab lens of the invention in the direction of width thereof.

On the other hand, in the case of the plate-shaped glass product prepared with both side surfaces covered with the film, as can be presumed from FIG. 3(b), a slab-shaped glass product having a gradient of refractive index only in the direction of thickness can be obtained already at the time when the heat treatment has been completed. Thus, a glass prism or plate, part of the top and bottom portions of which has been removed, has a gradient of refractive index almost satisfying the equation (1) as described above as shown in FIG. 4 in the direction of thickness while on the other hand having a uniform refractive index as shown in FIG. 5 in the direction of width.

Figure 6:
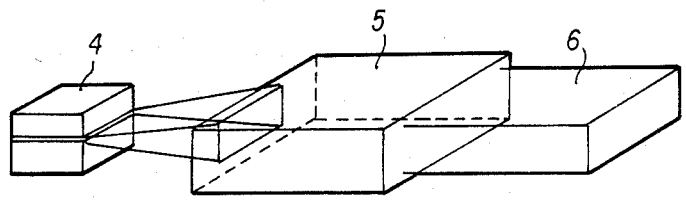
FIGS. 6 and 7 are each an illustrative view showing the use of the slab lens of the invention.
Figure 7:
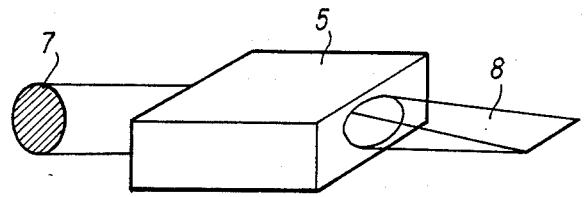

Hence, the slab-shaped lens prepared by the process of the invention is effective as an optical element, for example, as an optical element 5 as shown in FIG. 6 which is used to collimate a beam of light from a light source 4, the radiation angle of the light being large in only one direction or being varied, into a beam of parallel light 6, or as an optical element 5 as shown in FIG. 7 which is used to converge a beam of parallel light from a light source 7.

The present invention is described in greater detail by reference to the following examples.

EXAMPLE 1

A glass material consisting of 54.50% by weight $SiO_2$, 34.30% by weight $B_2O_3$, 5.20% by weight $Na_2O$ and 6.00% by weight $K_2O$ was melted at 1,450° C. for 3 hours while stirring it for about 1 hour during the melting process. The molten glass was casted into a mold, maintained at 580° C. for 1 hour, and thereafter, was allowed to cool in a furnace to give a glass block. This glass block was cut to form a glass plate having a thickness of 4 mm, a width of 12 mm and a length of 70 mm. This glass plate was heat-treated at 540° C. for 120 hours to cause the phase-separation. The thus-treated glass plate was treated in a 1.5N aqueous solution of $H_2SO_4$ at a temperature of 100° C. for 12 to 24 hours to obtain a porous glass plate.

The porous glass plate was soaked in an aqueous solution containing 120 g of $CsNO_3$ per 100 ml of water at a temperature of 100° C. for 24 hours to effect stuffing, and thereafter, soaked in an aqueous solution containing 40% by volume of ethanol at a temperature of 70° C. for 20 minutes to effect unstuffing. The glass plate was then soaked in an ethanol solution maintained at 0° C. for 3 hours to precipitate the dopant in the micropores. The glass plate was dried by maintaining it at room temperature for 1 day while evaporating the solvent. The glass plate was heat-treated at a temperature of 90° C. for 6 hours to collapse the micropores, whereby a transparent glass plate having a thickness of 3.6 mm, a width of 10.5 mm and a length of 60 mm was obtained.

Both side portions in the width of 2 mm from the outside in the direction of widthness of the glass plate were cut off. Additionally, the top and bottom end portions in the width of 2.5 mm from the outside in the direction of length were cut off to produce a plate-shaped glass product having a thickness of 3.6 mm, a width of 6.5 mm and a length of 55 mm.

The thus-produced glass product had a gradient of refractive index only in the direction of thickness. According to the equation (1) as described above, the refractive index distribution was $n_0 = 1.47$ and $g = 0.10$. That is, it was a slab lens having a uniform refractive index in the direction of thickness.

EXAMPLE 2

Both side surfaces of a porous glass product as prepared in the same manner as in Example 1 were covered with Teflon adhesive tape. For the porous glass product, stuffing, unstuffing, precipitation and drying were performed under the same conditions as in Example 1. Thereafter, the Teflon tapes were removed, and the porous glass product was heat-treated under the same conditions as in Example 1 to produce a transparent glass product having a thickness of 3.6 mm, a width of 10.5 mm and a length of 60 mm.

Top and bottom end portions in width of 2.5 mm from the outside in the direction of length of the glass plate were cut off, and the length of the central portion was set to 55 mm. The thus-produced glass plate was a slab lens having the same distribution constants as in Example 1 and having a gradient of refractive index only in the direction of thickness.

While the invention has been described in detail and with reference to specific embodiments thereof, it will be apparent to one skilled in the art that various changes and modifications can be made therein without departing from the spirit and scope thereof.

What is claimed is:

1. A process for producing a slab-shaped optical lens having a gradient of refractive index only in the direction of thickness thereof, which comprises:

stuffing a solution comprising a solvent and a dopant into micropores of a plate-shaped porous glass product, the plate-shaped product having length, width and thickness and corresponding axes, leaching said plate-shaped product to unstuff a part of the dopant to form a gradient of dopant concentration in the porous glass product, the gradient being in the thickness and width directions of the porous glass product, precipitating the dopant in the micropores, drying the porous glass product to evaporate the solvent remaining in the micropores, collapsing the micropores by applying a heat treatment to form a gradient of refractive index in the porous glass product, the gradient being in the thickness and width directions of the plate-shaped porous glass product, cutting off a slice from each side of the plate-shaped glass product to decrease the width of the plate-shaped glass product, the width of each slice being large enough such that the refractive index gradient in the width direction of the plate-shaped glass product is eliminated, and a slab-shaped optical lens having a gradient of refractive index only in the direction of thickness thereof is effected, such that light is converged in the direction toward the center of the thickness axis as it flows along the lens.

* * * * *